(12) United States Patent
Yanase et al.

(10) Patent No.: US 8,790,156 B2
(45) Date of Patent: Jul. 29, 2014

(54) TOOTH-PROFILE MANAGEMENT SYSTEM FOR SHAVING-CUTTER GRINDING MACHINE

(75) Inventors: Yoshikoto Yanase, Tokyo (JP); Ryuzo Hayashi, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 240 days.

(21) Appl. No.: 13/502,752

(22) PCT Filed: Oct. 6, 2010

(86) PCT No.: PCT/JP2010/067505
§ 371 (c)(1),
(2), (4) Date: Jun. 20, 2012

(87) PCT Pub. No.: WO2011/089761
PCT Pub. Date: Jul. 28, 2011

(65) Prior Publication Data
US 2012/0252318 A1  Oct. 4, 2012

(30) Foreign Application Priority Data
Jan. 20, 2010 (JP) ................................. 2010-009667

(51) Int. Cl.
*B24B 49/18* (2006.01)

(52) U.S. Cl.
USPC ........ 451/5; 451/21; 451/48; 451/56; 451/58; 451/443

(58) Field of Classification Search
CPC .... B24B 49/18; B24B 49/183; B24B 49/186; B24B 53/017; B24B 53/14; B24B 49/16; B24B 47/25

USPC .............................. 451/5, 21, 58, 443, 56, 48
See application file for complete search history.

(56) References Cited

U.S. PATENT DOCUMENTS

| 3,986,305 A | * | 10/1976 | Gunter .............................. 451/5 |
| 4,848,040 A | * | 7/1989 | Nishino ............................ 451/5 |
| 5,503,588 A | * | 4/1996 | Sweet ............................... 451/5 |
| 5,662,514 A | * | 9/1997 | Masseth et al. .................... 451/5 |

(Continued)

FOREIGN PATENT DOCUMENTS

| JP | 57-132923 A | 8/1982 |
| JP | 2-198713 A | 8/1990 |

(Continued)

OTHER PUBLICATIONS

Taiwanese Office Action dated Jan. 27, 2014 for corresponding Application No. 099136313 with a English translation.

*Primary Examiner* — George Nguyen
(74) *Attorney, Agent, or Firm* — Birch, Stewart, Kolasch & Birch, LLP (57) ABSTRACT

A personal computer has correction coefficients ($\alpha$) for tooth-profile error correction and correction coefficients ($\beta$) for meshing position correction which are set for each number of times a shaving cutter is sharpened, and for each cutter feature of the shaving cutter. Target tooth-profile data (Do), tooth-profile error data ($\Delta D$) which is the difference between the target tooth-profile data (Do) and measured tooth-profile data (Dm), and the correction coefficient ($\alpha$) and the correction coefficient ($\beta$) captured in correspondence with the number of times sharpening is performed, and the cutter features are applied to an equation $Dcc=Do+\alpha \cdot \Delta D+\beta$ to find aimed tooth-profile data (Dcc). Shaving-cutter tooth-profile data (ds) is found from the aimed tooth-profile data (Dcc). Thus, the shaving cutter can be sharpened appropriately even when the outer diameter and tooth thickness of the shaving cutter are reduced by sharpening the shaving cutter.

4 Claims, 4 Drawing Sheets

(56) References Cited

U.S. PATENT DOCUMENTS

| | | | |
|---|---|---|---|
| 5,738,569 A * | 4/1998 | Mackowsky | 451/56 |
| 6,217,409 B1 * | 4/2001 | Stadtfeld et al. | 451/5 |
| 6,390,893 B1 * | 5/2002 | Stadtfeld et al. | 451/47 |
| 7,172,495 B2 * | 2/2007 | Kobialka | 451/21 |
| 7,341,501 B2 * | 3/2008 | Yanase et al. | 451/5 |
| 7,651,383 B2 * | 1/2010 | Stadtfeld | 451/5 |
| 2005/0239385 A1 * | 10/2005 | Jankowski et al. | 451/540 |

FOREIGN PATENT DOCUMENTS

| | | |
|---|---|---|
| JP | 9-94742 A | 4/1997 |
| JP | 2005-103749 A | 4/2005 |
| JP | 2006-62026 A | 3/2006 |
| TW | 076350 | 4/1986 |
| TW | 406747 | 9/2000 |
| TW | 200924885 A | 6/2009 |
| TW | 200924906 A | 6/2009 |

* cited by examiner

Fig.4

TOOTH-PROFILE MANAGEMENT SYSTEM FOR SHAVING-CUTTER GRINDING MACHINE

TECHNICAL FIELD

This invention relates to a tooth-profile management system for a shaving-cutter grinding machine, which is designed to be capable of performing optimum sharpening of a shaving cutter.

BACKGROUND ART

A gear shaving machine equipped with a shaving cutter is used to finish the tooth flanks of a gear to be processed (hereinafter referred to as a workpiece gear), which has been gear-cut by a gear cutting machine (hobbing machine, gear shaping machine), to even more accurate ones.

The shaving cutter is a gear-shaped tool, which is meshed with a workpiece gear to finely cut the tooth flanks of the workpiece gear, thereby finishing (shaving) the tooth flanks. For this purpose, the tooth profile of the shaving cutter is formed in a shape corresponding to the aimed shape of the workpiece gear to be shaved.

After such a shaving cutter has shaved a plurality of workpiece gears, the tooth flanks of the shaving cutter wear out. Thus, the tooth profile of the shaving cutter needs to be regenerated so as to assume a shape corresponding to the aimed shape of the workpiece gear. That is, the worn-out shaving cutter needs to be sharpened.

If the shaving cutter wears out, this shaving cutter is detached from the gear shaving machine.

To regenerate the tooth profile of the shaving cutter so as to become a shape corresponding to the aimed shape of the workpiece gear, it is common practice to mount the shaving cutter on a shaving-cutter grinding machine and grind the shaving cutter for regeneration.

The shaving-cutter grinding machine has a rotating disk-shaped grindstone as a tool for grinding the shaving cutter. This shaving-cutter grinding machine imparts a gear-generating movement to the shaving cutter meshing with the disk-shaped grindstone to grind the tooth flanks of the shaving cutter, thereby sharpening the shaving cutter.

With the shaving-cutter grinding machine, as the grinding of the shaving cutter proceeds, the grindstone wears and its sharpness decreases. Thus, after grinding a plurality of shaving cutters successively, the worn-out grindstone is dressed to regenerate or newly create sharp tooth flanks. For dressing, a dresser device is used, and shaving-cutter grinding machines equipped with dresser devices are provided in large numbers.

The shaving-cutter grinding machine equipped with the dresser device has (1) a phase in which the grindstone grinds the shaving cutter, and (2) a phase in which the dresser device dresses the grindstone.

The status of the transfer of the tooth profile is summarized as follows:

In the shaving-cutter grinding machine, the shape of the grindstone having tooth flanks of a predetermined shape formed therein as a result of dressing by means of the dresser device is transferred to the shaving cutter. That is, the shaving cutter is ground by the grindstone, whereby sharpening of the shaving cutter takes place.

This shaving cutter is installed in a gear shaving machine to shave a workpiece gear, thereby transferring the shape of the shaving cutter to the workpiece gear.

That is, the tooth profile is transferred in the following sequence: grindstone of shaving-cutter grinding machine→shaving cutter→workpiece gear.

As described above, the tooth profile is transferred in the following sequence: grindstone of shaving-cutter grinding machine→shaving cutter→workpiece gear. Thus, in order that the tooth profile of the gear after shaving will become the targeted tooth profile, the grindstone is dressed to set the shape of the grindstone.

If the tooth profile of the gear after shaving deviates from the targeted tooth profile, dressing is carried out to eliminate this deviation, whereby the shape of the grindstone must be modified.

Thus, a method has been developed which, if the tooth profile of the gear after shaving deviates from the targeted tooth profile, performs dressing so as to eliminate this deviation, thereby modifying the shape of the grindstone (see, for example, Patent Document 1).

With the technology shown in Patent Document 1, the modification of the grindstone shape has been made in the following manner:

(1) Measure the shaved gear to obtain measured tooth-profile data (Dm).

(2) Find tooth-profile error data ($\Delta D$) which is the difference (Do−Dm) between target tooth-profile data (Do) showing the targeted tooth profile and the measured tooth-profile data (Dm) after shaving.

(3) Based on the tooth-profile error data ($\Delta D$) and the target tooth-profile data (Do), obtain aimed tooth-profile data (Dc).

If the correction coefficient is set at $\alpha$, for example, a computation $Dc = Do + \alpha \cdot \Delta D$ is performed to obtain the aimed tooth-profile data (Dc).

(4) Carry out an operation for data conversion of the aimed tooth-profile data (Dc) to obtain shaving-cutter tooth-profile data (ds).

(5) Control the dressing device to dress the grindstone so that the grindstone will have a grindstone surface shape to which the tooth profile of the shaving cutter specified by the shaving-cutter tooth-profile data (ds) has been transferred.

Upon modification of the grindstone surface shape of the grindstone in the above-described manner, the shaving cutter is ground with the so modified grindstone to sharpen the shaving cutter, whereby the tooth profile of the shaving cutter becomes an appropriate shape. Thus, the shaving cutter whose tooth profile has been modified to achieve the appropriate shape is mounted on the gear shaving machine, and the workpiece gear is shaved thereby. As a result, the tooth profile of the workpiece gear after shaving becomes the targeted tooth profile.

Each time the sharpening work of grinding the shaving cutter with the grindstone to sharpen the shaving cutter is done, the outer diameter and the tooth thickness of the shaving cutter decrease by amounts corresponding to the grinding. Furthermore, as the number of times the sharpening is performed increases, the amounts of the decreases in the outer diameter and the tooth thickness of the shaving cutter increase.

Thus, the technique of modifying the grindstone shape shown in Patent Document, if used alone, has caused the tooth profile of the gear after shaving to deviate from the targeted tooth profile. The larger the number of times the sharpening takes place, in particular, the greater such a problem becomes.

To obtain a more accurate tooth profile, therefore, it is necessary to further modify the aimed tooth-profile data (Dc) in accordance with the number of times the sharpening is carried out, thereby finding the modified aimed tooth-profile data (Dc'), in consideration of the fact that the outer diameter and tooth thickness of the shaving cutter decrease as a result of sharpening.

The modified aimed tooth-profile data (Dc') is subjected to an operation for data conversion to find shaving-cutter tooth-profile data (ds). In order that the grindstone will have a grindstone surface shape to which the tooth profile of the shaving cutter specified by the shaving-cutter tooth-profile data (ds) has been transferred, the dressing device is controlled to dress the grindstone.

PRIOR ART DOCUMENTS

Patent Documents

Patent Document 1: JP-A-2006-62026

SUMMARY OF THE INVENTION

Problems to be Solved by the Invention

How much the aimed tooth-profile data (Dc) should be modified in order to find the modified aimed tooth-profile data (Dc') has hitherto been determined by an operator's know-how.

Since the degree of modification differs according to the operator's ability or level of skill, the data value of the modified tooth-profile data (Dc') becomes different. As a result, depending on the operator's ability or level of skill, there has been a possibility that variations arise in the accuracy of the tooth profile of the gear after shaving.

Therefore, it has been difficult for an unskilled person to produce, without variation, a gear of a gear tooth profile with good accuracy.

It is an object of the present invention to provide a tooth-profile management system for a shaving-cutter grinding machine, which can ensure optimum sharpening of a shaving cutter, without relying on the operator's know-how, even when the outer diameter and tooth thickness of the shaving cutter are reduced as a result of sharpening the shaving cutter.

Means for Solving the Problems

A constitution of the present invention for solving the above-mentioned problems is a tooth-profile management system for a shaving-cutter grinding machine (30) in which a shaving cutter is ground with a grindstone to sharpen the shaving cutter, and a grindstone surface of the grindstone is dressed by a dresser device to form a grindstone surface shape of the grindstone, comprising:

a computing unit (10) having a tooth-profile error computing function of finding tooth-profile error data ($\Delta D$) which is a difference between measured tooth-profile data (Dm) showing a measured tooth profile and obtained by measuring a gear shaved by the shaving cutter, and target tooth-profile data (Do) showing a target tooth profile of the gear, an aimed tooth-profile computing function of finding aimed tooth-profile data (Dcc) by applying the target tooth-profile data (Do) and the tooth-profile error data ($\Delta D$) to a predetermined computing equation containing correction coefficients, and a shaving-cutter tooth-profile computing function of finding shaving-cutter tooth-profile data (ds) showing a tooth profile of the shaving cutter being a tooth profile to which a tooth profile of the gear specified by the aimed tooth-profile data (Dcc) has been transferred; and control means (20) for controlling dressing of the grindstone by the dresser device such that the grindstone has a grindstone surface shape to which the tooth profile of the shaving cutter specified by the shaving-cutter tooth-profile data (ds) has been transferred, wherein the computing unit (10) has databases in which correction coefficients ($\alpha$) for tooth-profile error correction for adjusting the tooth-profile error data ($\Delta D$) in consideration of an outer diameter and a tooth thickness of the shaving cutter decreasing in accordance with sharpening, and correction coefficients ($\beta$) for meshing position correction for adjusting a meshing position of the shaving cutter and the gear in consideration of the outer diameter and the tooth thickness of the shaving cutter decreasing in accordance with sharpening are set for each number of times the shaving cutter is sharpened, the databases being set for each of cutter features of the shaving cutter, and when finding the aimed tooth-profile data (Dcc), the computing unit (10) captures the correction coefficient ($\alpha$) and the correction coefficient ($\beta$) conformed to the number of times the shaving cutter is sharpened, from the database having the cutter features corresponding to the cutter features of the shaving cutter to be sharpened by the shaving-cutter grinding machine (30), and performs a computation using the captured correction coefficient ($\alpha$) and correction coefficient ($\beta$).

Another constitution of the present invention is characterized in that the computing unit (10) applies the target tooth-profile data (Do), the tooth-profile error data ($\Delta D$), and the captured correction coefficient ($\alpha$) and correction coefficient ($\beta$) to the following equation to find the aimed tooth-profile data (Dcc):

$$Dcc = Do + \alpha \cdot \Delta D + \beta$$

Still another constitution of the present invention is characterized in that for the shaving cutter having new cutter features which are not the cutter features set in the databases, the computing unit (10) performs computations, while learning, based on the databases having the already set cutter features to find a database for the new cutter features, and sets it.

Effects of the Invention

According to the present invention, the shaving cutter can be sharpened optimally, without reliance on the operator's know-how, simply by inputting the target tooth-profile data and the measured tooth-profile data. Furthermore, this sharpening can be carried out appropriately, without an adverse influence being exerted even when the outer diameter and tooth thickness of the shaving cutter are reduced in accordance with the sharpening of the shaving cutter.

MODE FOR CARRYING OUT THE INVENTION

The mode for carrying out the present invention will be described in detail below based on embodiments.

Embodiment 1

Figure 1:
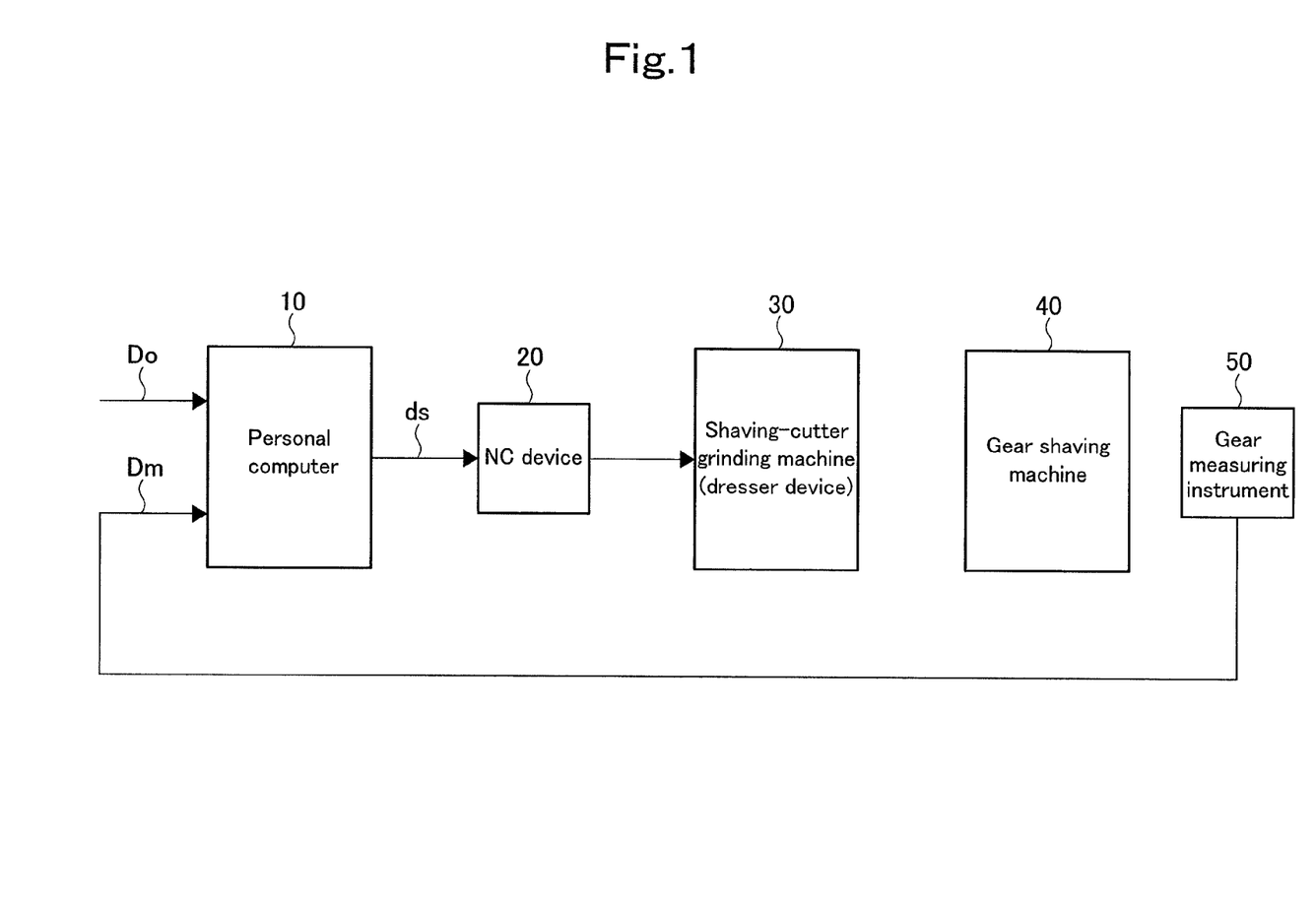
[FIG. 1] is a schematic configurational drawing showing a gear processing system which includes a tooth-profile management system for a shaving-cutter grinding machine according to an embodiment of the present invention.

FIG. 1 is a schematic configurational drawing showing a gear processing system which includes a tooth-profile management system for a shaving-cutter grinding machine according to Embodiment 1 of the present invention.

As shown in FIG. 1, the gear processing system is composed of a personal computer 10, an NC device 20, a shaving-cutter grinding machine 30 equipped with a dresser device, a gear shaving machine 40, and a gear measuring instrument 50. The tooth-profile management system for a shaving-cutter grinding machine according to Embodiment 1 of the present invention is constructed by the personal computer 10 and the NC device 20.

The roles and functions of each device of the gear processing system are outlined as follows:

The personal computer 10 has an arithmetic operation program and correction computation databases. The personal computer 10 performs arithmetic operations in accordance with the arithmetic operation program, while referring to the correction computation database, to find shaving-cutter tooth-profile data ds, and outputs it.

In the phase in which the grindstone is dressed by the dresser device of the shaving-cutter grinding machine 30, the NC device 20 controls the dresser device of the shaving-cutter grinding machine 30 based on the shaving-cutter tooth-profile data ds.

In the phase in which the shaving cutter is ground with the grindstone of the shaving-cutter grinding machine 30, the NC device 20 controls the grindstone.

Under control by the NC device 20, the shaving-cutter grinding machine 30 dresses the grindstone by the dresser device, and grinds the shaving cutter by the grindstone to sharpen the shaving cutter.

The gear shaving machine 40 shaves the workpiece gear with the use of the shaving cutter sharpened by the shaving-cutter grinding machine 30.

The gear measuring instrument 50 measures the tooth profile of the workpiece gear shaved by the gear shaving machine 40 to obtain measured tooth-profile data Dm, and sends it to the personal computer 10.

To the personal computer 10, target tooth-profile data Do showing the targeted tooth profile of the workpiece gear is inputted by an input device (not shown). The target tooth-profile data Do differs according to the gear features (module, number of teeth, pressure angle, helix angle, tooth width, etc.) of the workpiece gear.

Figure 2:
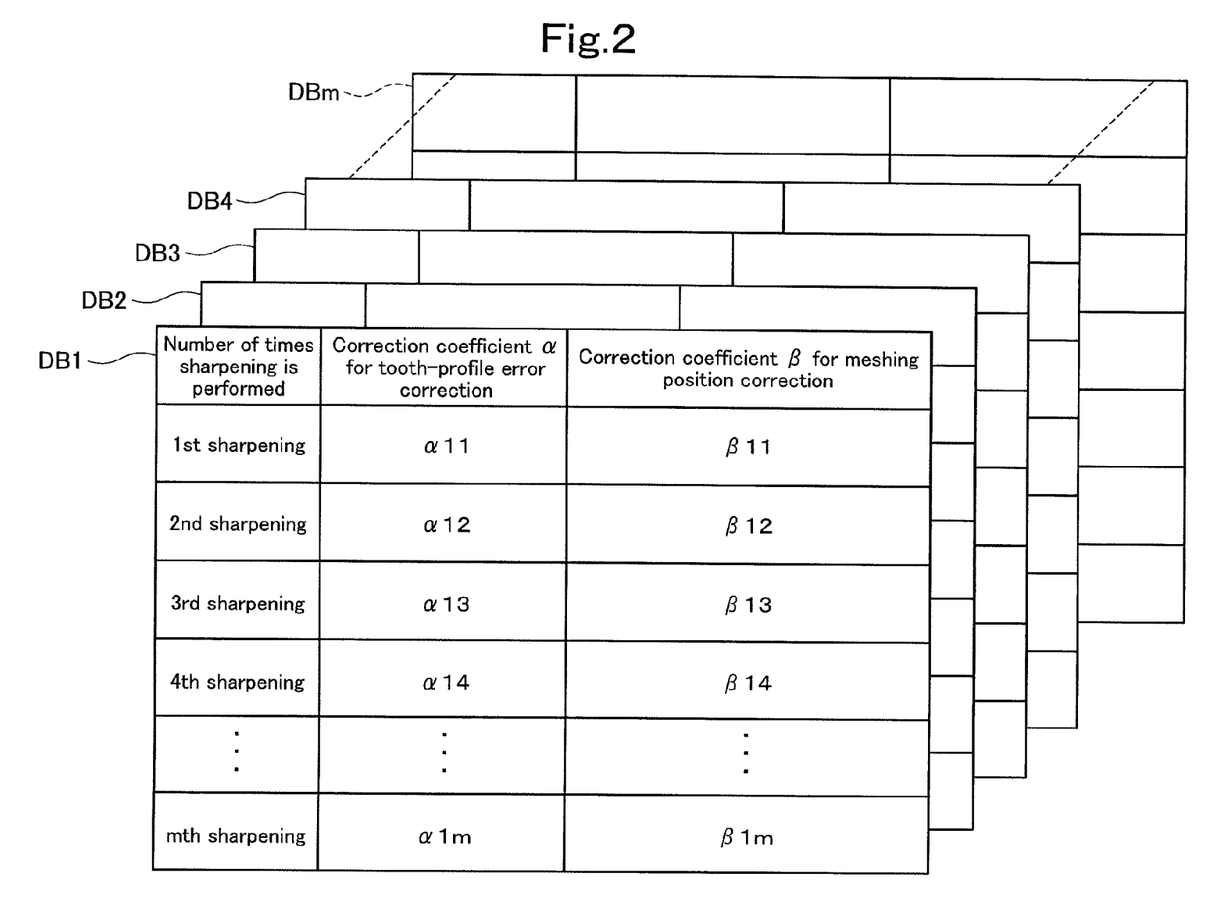
[FIG. 2] is a conceptual drawing showing correction computation databases DB1 to DBm.

Next, correction computation databases DB1 to DBm stored in the personal computer 10 will be explained.

The personal computer 10 stores beforehand the correction computation databases DB1 to DBm as shown in FIG. 2. Each of the correction computation databases DB1 to DBm is set for each different cutter feature among the cutter features (module, number of teeth, pressure angle, helix angle, tooth width, etc.) of the shaving cutter. That is, the correction computation database DB1 is set in correspondence with the first cutter features, the correction computation database DB2 is set in correspondence with the second cutter features, and the correction computation database DBm is set in correspondence with the mth cutter features.

The correction computation database DB1 will now be described further. With the correction computation database DB1, correction coefficients $\alpha 11, \alpha 12, \ldots \alpha 1m$ for tooth-profile error correction and correction coefficients $\beta 11, \beta 12, \ldots \beta 1m$ for meshing position correction are set for each number of times sharpening is performed.

The correction coefficients $\alpha 11, \alpha 12, \ldots \alpha 1m$ and the correction coefficients $\beta 11, \beta 12, \ldots \beta 1m$ are obtained by a skilled operator who has performed arithmetic operations based on the measured tooth-profile data Dm and the target tooth-profile data Do to find the optimum shaving-cutter tooth-profile data ds and, in so doing, has collected the correction coefficients set by the skilled operator for each number of times sharpening has been performed, and has compiled the results into data (the correction coefficients $\alpha$, $\beta$).

The skilled operator sets the correction coefficients in consideration of the fact that each time the grindstone grinds the shaving cutter to sharpen the shaving cutter, the outer diameter and tooth thickness of the shaving cutter are reduced by amounts corresponding to grinding.

Thus, the correction coefficients $\alpha 11, \alpha 12, \ldots \alpha 1m$ and the correction coefficients $\beta 11, \beta 12, \ldots \beta 1m$ obtained by compiling data on the correction coefficients set by the skilled operator are captured, and arithmetic operations are performed based on the measured tooth-profile data Dm and the target tooth-profile data Do to find the shaving-cutter tooth-profile data ds. The found shaving-cutter tooth-profile data ds has the optimum data value which is not affected by the outer diameter and tooth thickness of the shaving cutter decreasing as a result of sharpening.

The correction coefficients $\alpha 11, \alpha 12, \ldots \alpha 1m$ are correction coefficients for adjusting the magnitude of the tooth-profile error which is the error between the target tooth profile and the measured tooth profile of the workpiece gear, whereas the correction coefficients $\beta 11, \beta 12, \ldots \beta 1m$ are correction coefficients for adjusting the meshing position (position in the tooth depth direction) of the shaving cutter and the workpiece gear.

The other correction computation databases DB2 to DBm are also set by data compilation done in the same manner as for the correction computation database DB1.

Thus, the correction coefficients of the correction computation databases DB2 to DBm are captured, and arithmetic operations are performed based on the measured tooth-profile data Dm and the target tooth-profile data Do to find the shaving-cutter tooth-profile data ds. The found shaving-cutter tooth-profile data ds is of the optimum data value which is not affected by the outer diameter and tooth thickness of the shaving cutter decreasing as a result of sharpening.

Figure 4:
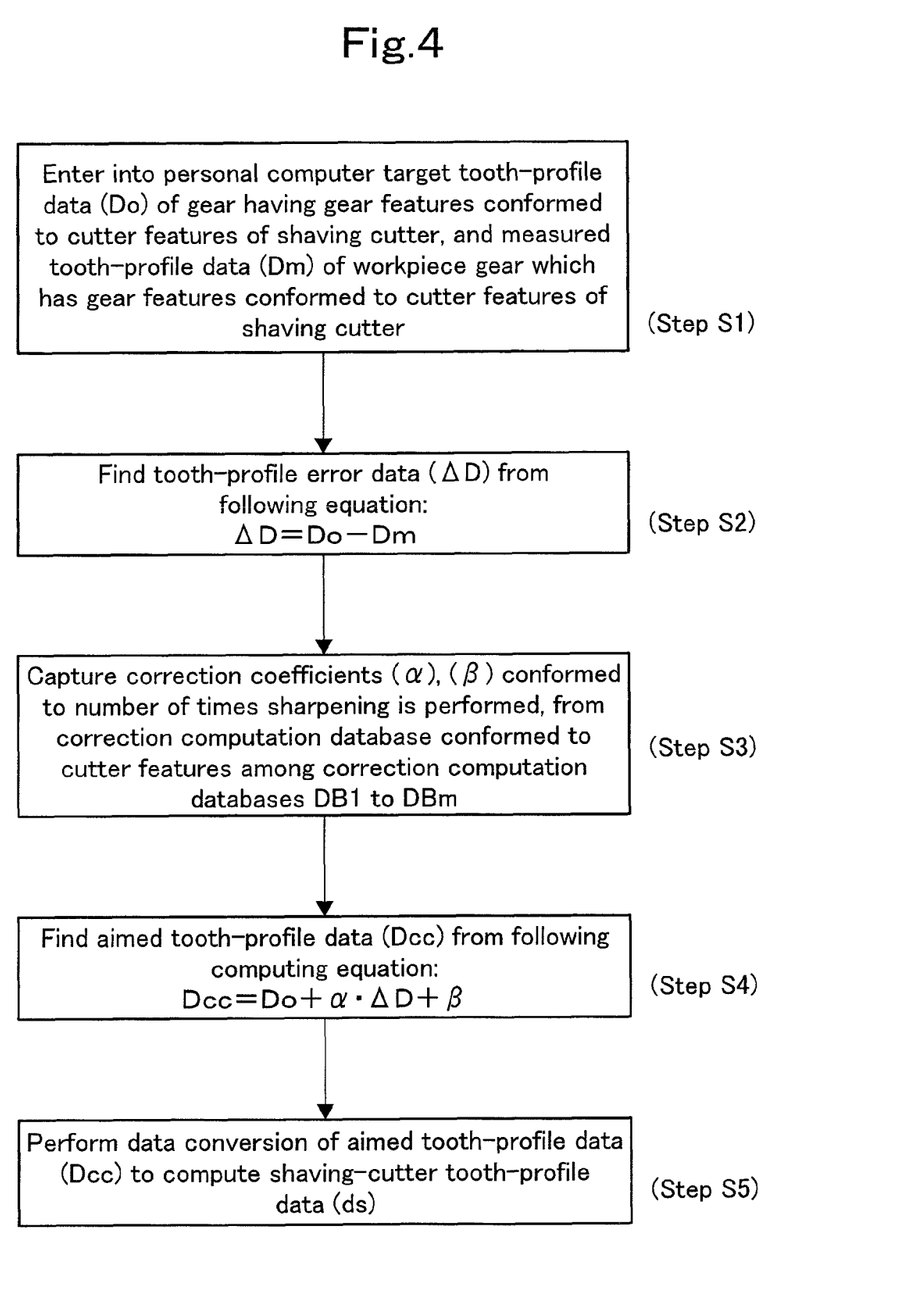
[FIG. 4] is a flowchart showing arithmetic operations by a personal computer.

Next, the arithmetic operations in the personal computer 10 will be described with reference to FIG. 4 which is a flowchart.

Figure 3:
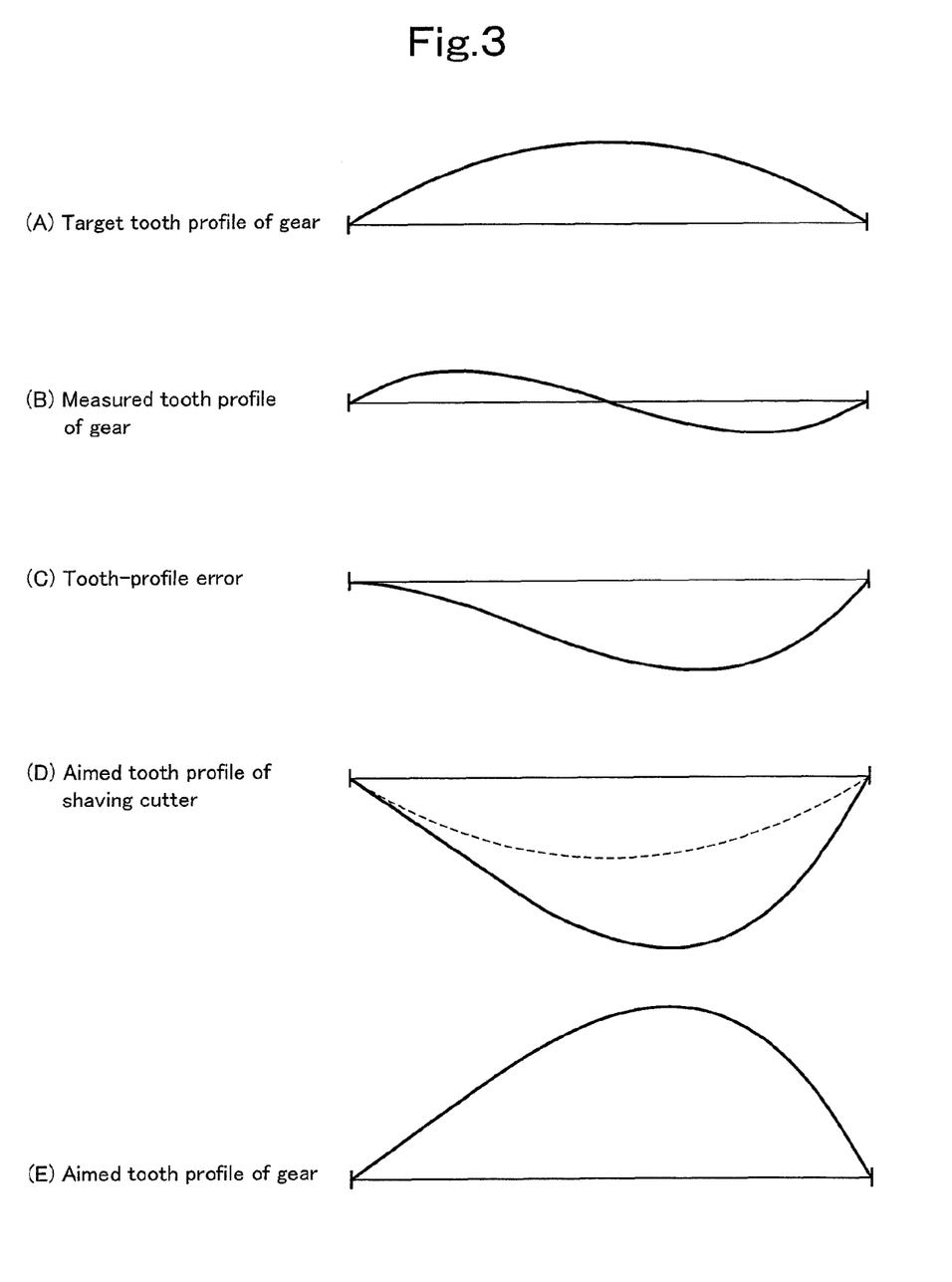
[FIGS. 3(A) to 3(E)] are characteristic views showing tooth profiles.

If the shaving cutter to be sharpened has the first cutter features (module, number of teeth, pressure angle, helix angle, tooth width, etc.), the target tooth-profile data (Do) showing the target tooth profile of the workpiece gear (see FIG. 3(A)) having the first gear features (module, number of teeth, pressure angle, helix angle, tooth width, etc.) is inputted to the personal computer 10.

The gear features correspond to the cutter features of the shaving cutter.

The workpiece gear having the first gear features (module, number of teeth, pressure angle, helix angle, tooth width, etc.) after shaving is measured with the gear measuring instrument 50. The measured tooth-profile data Dm showing the measured tooth profile of the measured gear (see FIG. 3(B)) is inputted to the personal computer 10 (Step S1).

Then, the personal computer 10 performs the following arithmetic operations (1) to (4):

(1) The tooth-profile error data (ΔD) which is the difference (Do−Dm) between the target tooth-profile data (Do) and the measured tooth-profile data (Dm) is computed. This tooth-profile error data ΔD shows the tooth-profile error (see FIG. 3(C)) which is the error between the target tooth profile and the measured tooth profile (Step S2).

(2) Further, the correction coefficient α for tooth-profile error correction and the correction coefficient β for meshing position correction are captured from the correction computation database DB1. For example, the correction coefficients α11, β11 are captured for the first sharpening, the correction coefficients α12, β12 are captured for the second sharpening, and similarly the correction coefficients α1$m$, β1$m$ are captured for the mth sharpening (Step S3).

Here, an explanation will be continued on the assumption that sharpening is the first one and the correction coefficients α11, β11 are captured.

(3) Based on the tooth-profile error data ΔD, the target tooth-profile data D, and the correction coefficients α11, β11, a computation is performed in accordance with a predetermined computing equation to find the aimed tooth-profile data Dcc (Step S4).

For example, the computation Dcc=Do+α11·ΔD+β11 is performed to find the aimed tooth-profile data Dcc.

(4) The aimed tooth-profile data Dcc is subjected to data conversion to compute the shaving-cutter tooth-profile data ds (Step S5).

The aimed tooth profile of the shaving cutter represented by the computed shaving-cutter tooth-profile data ds is, for example, one indicated by a solid line in FIG. 3(D).

What is indicated by a dashed line in FIG. 3(D) is the tooth profile of the shaving cutter corresponding to the target tooth profile of the gear shown in FIG. 3(A). That is, the tooth profile of the shaving cutter indicated by the dashed line in FIG. 3(D) is modified into the aimed tooth profile of the shavinc cutter indicated by the solid line in FIG. 3(D).

FIG. 3(E) shows the aimed tooth profile of the gear. The aimed tooth profile of the gear shown in FIG. 3(E) is one to which the aimed tooth profile of the shaving cutter indicated by the solid line in FIG. 3(D) has been transferred.

After the personal computer 10 has computed and outputted the shaving-cutter tooth-profile data ds, the NC device 20 controls the dressing device provided in the shaving-cutter grinding machine 30 to dress the grindstone provided in the shaving-cutter grinding machine 30 so as to achieve the grindstone surface shape of the grindstone to which the tooth profile of the shaving cutter specified by the shaving-cutter tooth-profile data ds has been transferred.

With the shaving-cutter grinding machine 30, the shaving cutter is ground with the grindstone having, formed therein, a grindstone surface shape to which the tooth profile of the shaving cutter specified by the shaving-cutter tooth-profile data ds has been transferred by the above-mentioned dressing. By so doing, the shape of the grindstone is transferred to the shaving cutter.

By shaving the workpiece gear by the gear shaving machine 40 using this shaving cutter, the tooth profile of the gear after shaving becomes the targeted tooth profile, even if the outer diameter and tooth thickness of the shaving cutter are reduced by amounts corresponding to grinding as a result of sharpening.

In the present embodiment, the optimum shaving-cutter tooth-profile data ds is automatically obtained simply by entering the measured tooth-profile data Dm and the target tooth-profile data Do into the personal computer 10 as described above.

Even when the outer diameter and tooth thickness of the shaving cutter are reduced by amounts corresponding to grinding as a result of sharpening, therefore, it suffices to dress the grindstone surface of the grindstone so as to attain a grindstone surface shape having, transferred thereto, the tooth profile of the shaving cutter specified by the shaving-cutter tooth-profile data ds found by the personal computer 10. By this measure, the tooth profile of the workpiece gear obtained by shaving by means of the gear shaving machine 40 becomes the target shape.

If the shaving cutter to be sharpened has any of the second to mth cutter features (module, number of teeth, pressure angle, helix angle, tooth width, etc.), the target tooth-profile data (Do) showing the target tooth profile of the workpiece gear having the corresponding gear features among the second to mth gear features (module, number of teeth, pressure angle, helix angle, tooth width, etc.) (see FIG. 3(A)) is inputted to the personal computer 10.

The workpiece gear having any of the second to mth gear features (module, number of teeth, pressure angle, helix angle, tooth width, etc.) after shaving is measured with the gear measuring instrument 50. The measured tooth-profile data Dm showing the measured tooth profile of the measured gear (see FIG. 3(B)) is inputted to the personal computer 10.

Subsequently, the same arithmetic operations as those described above are performed. The personal computer 10 computes the shaving-cutter tooth-profile data ds. The NC device 20 controls the dressing device provided in the shaving-cutter grinding machine 30 to dress the grindstone provided in the shaving-cutter grinding machine 30 such that the grindstone achieves the grindstone surface shape to which the tooth profile of the shaving cutter specified by the shaving-cutter tooth-profile data ds has been transferred.

With the shaving-cutter grinding machine 30, the shape of the grindstone having the grindstone surface shape formed therein in the above manner is transferred to the shaving cutter.

By shaving the workpiece gear by the gear shaving machine 40 using this shaving cutter, the tooth profile of the gear after shaving becomes the targeted tooth profile, even if the outer diameter and tooth thickness of the shaving cutter are reduced by amounts corresponding to grinding as a result of sharpening.

As shown above, when the shaving cutter has any of the second to mth cutter features (module, number of teeth, pressure angle, helix angle, tooth width, etc.), namely, even when the gear features are any of the second to mth gear features (module, number of teeth, pressure angle, helix angle, tooth width, etc.), the optimum shaving-cutter tooth-profile data ds is automatically obtained simply by inputting the measured tooth-profile data Dm and the target tooth-profile data Do to the personal computer 10.

Thus, even when the outer diameter and tooth thickness of the shaving cutter are reduced by amounts corresponding to grinding as a result of sharpening, therefore, it suffices to dress the grindstone surface of the grindstone so as to attain a grindstone surface shape having, transferred thereto, the tooth profile of the shaving cutter specified by the shaving-cutter tooth-profile data ds found by the personal computer 10. By this measure, the tooth profile of the workpiece gear obtained by shaving by means of the gear shaving machine 40 becomes the target shape.

In the foregoing embodiment, the correction coefficients α, β are established by collecting the correction coefficients set by the skilled operator and compiling them into data. However, the so established correction coefficients α, β are not limitative, and it is permissible to measure the outer diameter and tooth thickness of the shaving cutter, and determine the correction coefficients α, β based on the measured outer diameter and tooth thickness of the shaving cutter.

Embodiment 2

In Embodiment 2, as in Embodiment 1, the personal computer 10 prestores the correction computation databases DB1 to DBm conformed to the cutter features of the shaving cutter.

Embodiment 2, moreover, has a computing function which, when a shaving cutter having cutter features not stored in the database (for example, the (m+1)th cutter features) is to be sharpened, performs computations by learning control to find a correction computation database (e.g., database Dm+1) corresponding to the new cutter features (e.g., the (m+1)th cutter features).

For example, using a learning technology by back propagation, computations are carried out based on the correction computation databases DB1 to DBm to find correction coefficients corresponding to the new cutter features m+1.

After the correction coefficients are found in the above manner, sharpening, shaving, and measurement of the workpiece gear are performed. Upon confirmation of satisfactory shaving, such correction coefficients are registered, and entered into a correction computation database (e.g., database Dm+1) corresponding to new cutter features (e.g., the (m+1)th cutter features). From the next time onward, the correction coefficients obtained can be used as in Embodiment 1.

In Embodiment 2, therefore, even with the use of a shaving cutter having the new cutter features, it is possible to carry out the sharpening of the shaving cutter which ensures optimum shaving, without being influenced by the fact that the outer diameter and tooth thickness of the shaving cutter are reduced by amounts corresponding to grinding as a result of sharpening.

EXPLANATIONS OF LETTERS OR NUMERALS

10 Personal computer
20 NC device
30 Shaving-cutter grinding machine
40 Gear shaving machine
50 Gear measuring instrument
Do Target tooth-profile data
Dm Measured tooth-profile data
ds Shaving-cutter tooth-profile data

The invention claimed is:

1. A tooth-profile management system for a shaving-cutter grinding machine in which a shaving cutter is ground with a grindstone to sharpen the shaving cutter, and a grindstone surface of the grindstone is dressed by a dresser device to form a grindstone surface shape of the grindstone, comprising:
 a computing unit having
   a tooth-profile error computing function of finding tooth-profile error data (ΔD) which is a difference between measured tooth-profile data (Dm) showing a measured tooth profile and obtained by measuring a gear shaved by the shaving cutter, and target tooth-profile data (Do) showing a target tooth profile of the gear,
   an aimed tooth-profile computing function of finding aimed tooth-profile data (Dcc) by applying the target tooth-profile data (Do) and the tooth-profile error data (ΔD) to a predetermined computing equation containing correction coefficients, and
   a shaving-cutter tooth-profile computing function of finding shaving-cutter tooth-profile data (ds) showing a tooth profile of the shaving cutter being a tooth profile to which a tooth profile of the gear specified by the aimed tooth-profile data (Dcc) has been transferred; and
 control means for controlling dressing of the grindstone by the dresser device such that the grindstone has a grindstone surface shape to which the tooth profile of the shaving cutter specified by the shaving-cutter tooth-profile data (ds) has been transferred,
 wherein the computing unit has databases in which correction coefficients (α) for tooth-profile error correction for adjusting the tooth-profile error data (ΔD) in consideration of an outer diameter and a tooth thickness of the shaving cutter decreasing in accordance with sharpening, and correction coefficients (β) for meshing position correction for adjusting a meshing position of the shaving cutter and the gear in consideration of the outer diameter and the tooth thickness of the shaving cutter decreasing in accordance with sharpening are set for each number of times the shaving cutter is sharpened, the databases being set for each of cutter features of the shaving cutter, and
 when finding the aimed tooth-profile data (Dcc), the computing unit captures the correction coefficient (α) and the correction coefficient (β) conformed to the number of times the shaving cutter is sharpened, from the database having the cutter features corresponding to the cutter features of the shaving cutter to be sharpened by the shaving-cutter grinding machine, and performs a computation using the captured correction coefficient (α) and correction coefficient (β).

2. The tooth-profile management system for a shaving-cutter grinding machine according to claim 1, wherein
 the computing unit applies the target tooth-profile data (Do), the tooth-profile error data (ΔD), and the captured correction coefficient (α) and correction coefficient (β) to the following equation to find the aimed tooth-profile data (Dcc):

$$Dcc = Do + \alpha \cdot \Delta D + \beta.$$

3. The tooth-profile management system for a shaving-cutter grinding machine according to claim 1, wherein
 for the shaving cutter having new cutter features which are not the cutter features set in the databases, the computing unit performs computations, while learning, based on the databases having the already set cutter features to find a database for the new cutter features, and sets it.

4. The tooth-profile management system for a shaving-cutter grinding machine according to claim 2, wherein
 for the shaving cutter having new cutter features which are not the cutter features set in the databases, the computing unit performs computations, while learning, based on the databases having the already set cutter features to find a database for the new cutter features, and sets it.

* * * * *